United States Patent [19]
Miyake et al.

[11] 3,801,461
[45] Apr. 2, 1974

[54] PROCESS FOR THE EXTRACTION OF ENZYMES FROM MICROORGANISMS

[75] Inventors: Toshio Miyake; Makoto Shiosaka, both of Okayama, Japan

[73] Assignee: Hayashibara Company, Okayama, Japan

[22] Filed: Aug. 31, 1971

[21] Appl. No.: 176,732

[30] Foreign Application Priority Data
Sept. 2, 1970   Japan.................................. 45/76857

[52] U.S. Cl............................................. 195/66 R
[51] Int. Cl............................................. C07g 7/028
[58] Field of Search............... 195/66 R, 66 A, 66 B

[56] References Cited
UNITED STATES PATENTS
3,585,179   6/1971   Samejima et al................. 260/112 R

OTHER PUBLICATIONS

Hatefi et al., Proc. National Academy of Sciences Vol. 62, pages 1,129–1,136. (1969)

Dixon et al., Enzymes 3rd. Edition 1964 pages 33–34.

*Primary Examiner*—Lionel M. Shapiro
*Attorney, Agent, or Firm*—Browdy and Neimark

[57]  ABSTRACT

The present invention relates to a process for the extraction of enzymes from microorganisms which is characterized in that an urea solution is used in the extraction of intracellular enzymes produced in cells of microorganisms.

4 Claims, No Drawings

PROCESS FOR THE EXTRACTION OF ENZYMES FROM MICROORGANISMS

The present invention relates to a process for the extraction of enzymes from microorganisms which is characterized in that an urea solution is used in the extraction of intracellular enzymes produced in cells of microorganisms.

Great importance is being placed on the utilization of enzymes with the recent progress in the chemical industry. Besides amylases which are well known for many years, proteinases, cellulases, isomerases, etc. are being used for industrial purposes. In order to meet these demands various enzymes are being produced on industrial scales by the cultivation or fermentation of microorganisms such as fungi and bacteria. These enzymes are liberated from the cells extracellulary, however, there are various intracellular enzymes that are not liberated extracellularly. Prior to the utilization of these enzymes, the enzymes are extracted from the cells, fractionated or purified. However, in the initial stage it is necessary to extract and liberate the enzymes from the cells in a high yield.

Enzymes are generally extracted from cells of microorganisms by either allowing the culture broth to stand and wait the liberation of the enzymes effected by the autolysis of the cell walls or accelerating the lysis of the cells with the employment of a lysis-promoting-agent such as sodium dodecyl sulfate, and then isolating the enzymes from the cells. The alternative methods which have been proposed are the methods involving mechanical destruction of the cell walls either by trituration, ultrasonication or the French press method and the freezing and thawing method, as well as the method of destroying the cell walls enzymatically with the employment of lysozyme. These methods are not easily applicable for industrial practice and, moreover, high efficiencies can not be realized with any of the above methods. Only some of the complicated methods such as the dialysis method and gel-filtration method are practiced in laboratories.

The inventors have studied the utilization of aqueous urea solutions in the extractions of proteins from botanical tissues and microorganism cells for food and feed. The methods using aqueous urea solutions for the extraction of enzyme have not been studied because the methods accompany inactivation during the extraction of enzymes with specific enzyme activities. Urea is generally known as a denaturing agent of protein. Denaturation of protein means inactivation of enyzmes. The inventors, however, investigated the utilization of the solubility of protein against aqueous urea solutions and studied extraction with aqueous urea solutions on enzymes, extractions of which are difficult, such as transferase of *Mucor javanicus* which belongs to fungi, or pullulanase of a bacterium, *Aerobacter aerogenes*. The inventors found that extractions of enzymes, which are difficult even by the mechanical or lysis method can be practiced efficiently without causing inactivation. More particularly, the inventors have thus provided a process which is applicable for the extractions of enzymes, which were previously impossible by the use of an autolysis promoting agent or by a mechanical method of extraction, which has no undesirable effects on the enzymatic activities, and which is a superb and novel process for the extraction of intracellular enzymes feasible for industrial applications in view of the abundance and the reasonable price of urea.

The extraction procedure of the invention will be illustrated further. Enzymes of fungi and bacteria can be extracted using urea solutions. The cells obtained by liquid culture are collected by centrifuge or filtration, washed with water and used in the subsequent procedures. Needless to say, either fresh cells or dry cells are employable in the invention. Since the concentrations of the urea solutions to be used for the extraction depend on the variety of the microorganisms, it is preferable to perform preliminary tests on each variety of microorganism. Generally, a higher concentration than in the case of an extraction with the use of an autolysis-promoting-agent is required, and in the case of extracting mycelium of *Mucor* an urea solution with a concentration of 1–6 Mol was used. Cells to which were added an urea solution with a desirable concentration were extracted for 5–100 hours under static or agitating conditions. Any known method is applicable for the extraction. Cells filled in an extraction tower may be extracted with the employment of an urea solution either by the continuous or recycling method. In this case the solution and contact period of cells fluctuate to a great extent depending on the method employed. Although higher temperature is preferable the temperature should fall in the range that does not effect inactivation, usually the range is from 30° C to 50° C.

pH is another factor to be considered in extraction. It is indispensable to carry out the extraction at a pH which falls within the pH stability range of the given enzyme. If the pH varies greatly in the extraction procedure a sufficient amount of a buffer solution with a suitable pH is added. In case the pH rises by the coexistence of urease a specific inhibitor which affects urease is added. In carrying out batch system extraction the extraction runs should be repeated until the intracellular enzymes are extracted completely.

Further, in the case of extracting enzymes which are oxidized easily, precautions should be taken to avoid contact of cells with air or the extraction should be performed in an inert gas atmosphere.

The urea or buffer solutions employed in the extraction are removed by dialysis or by other methods. The extraction solution is then freed completely from cells, if necessary, salted out or fractionated with a organic solvent or organic solvent mixtures or precipitated, then purified, and concentrated. Thereafter pure enzymes are obtainable by chromatography or gel-filtration.

The inventors studied *Mucor javanicus* as an example of a fungus that produces transglucosidases. The enzymes are intracellular enzymes which are difficult to extract even by the trituration method or with the addition of a lysis-promoting-agent, such as sodium dodecyl sulfate (hereinafter referred to as S.D.S.). The inventors attempted extraction of the enzymes as follows. To one gr. of fresh mycelia (moisture content 90 %), obtained by centrifuging a culture broth of any of the above fungus and water washing, was added 10 ml of an extraction solution which was prepared by dissolving 2–6 Mol urea in an acetate buffer, pH 5.3. The mixture was extracted at 30° C exhibiting the results given in the following table. An extraction of over 60 % of the enzymes was found possible under static conditions. On the contrary, the yields of the extraction method by the addition of S.D.S., trituration method after freezing and thawing, and the ultrasonic treatment fell in the range of only 0 % –16.7 %.

TABLE

Results of Enzyme Extractions with the Addition of Urea

| Extraction Agent | Concentration the Extraction Agent | Conditions of Extraction | Extraction Period (hr) | | | |
|---|---|---|---|---|---|---|
| | | | 20 | 44 | 68 | 92 |
| Water | | Static | 0% | –% | –% | –% |
| ½ Mol Urea Solution pH 5.3, and Acetate Buffer Solution | 0 Mol | Static | 6.5 | 8.4 | 15.2 | 15.2 |
| | 2 do. | do. | 17.2 | 33.8 | 30.9 | 30.0 |
| | 4 do. | do. | 28.3 | 54.7 | 63.0 | 64.3 |
| | 6 do. | do. | 28.8 | 54.1 | 62.4 | 50.6 |
| | 0 Mol | Agitation | 0 | 5.5 | 10.9 | 13.4 |
| | 2 do. | do. | 6.0 | 24.2 | 40.3 | – |
| | 4 do. | do. | 23.6 | 32.5 | 35.5 | 36.8 |
| | 6 do. | do. | 32.0 | 53.4 | 57.1 | 60.0 |
| S.D.S. | 0.1% | Agitation | 2.0 | 6.1 | – | 13.9 |
| | 0.2% | do. | 4.7 | 8.6 | – | 16.7 |
| | 0.3 | do. | 6.0 | 9.4 | – | 8.5 |
| Triturated sufficiently with sea sand after freezing and thawing | | | | | | 2.5 % |
| Ultrasonic treatment (20 kilocycles, 30 minutes) | | | | | | 0 % |

The invention will be illustrated further by the following examples which show specific embodiments thereof. It will be understood that the examples are presented for illustration purposes only and not by way of limitation. Unless otherwise specified, all percentages indicated are based on weight.

EXAMPLE 1

Fresh mycelia were obtained by centrifuging a liquid culture medium on which strains of *Mucor javanicus* IFO 4570 were cultivated and thereafter washing the mycelia thus collected from the liquid culture. 688 grams of the fresh mycelia (moisture content 82.6 %) was immersed in 5.43 litres of ½ M acetate buffer solution (pH 5.3) containing 4.15 M urea wherein the mycelia were kept at 30° C for 44 hours. The mycelia were then centrifuged and washed. The washed mycelia were immersed again in 4 liters of a 4 M urea solution and extracted at 30° C for over a period of 44 hours. Then the mycelia were centrifuged again and the supernatants of the second and third centrifuges and the washed liquids were determined on the enzymatic activities. The results showed that 60.3 % of the enzymatic activities of the mycelia was extracted by the first extraction and the total enzymatic activity extracted from the mycelia by a duplicate extraction was found 91.4 %.

EXAMPLE 2

The cells obtained by a liquid culture of *Aerobacter aerogenes* ATCC 8724 were collected by centrifuge and then washed. 100 grs. of the cells (moisture content 89 %) were collected by centrifuge, washed, immersed in 1 liter of 1 M urea solution (pH 6.0, ½ M acetate buffer solution) wherein the cells were extracted at 30° C for 24 hours. The extracted cells were centrifuged and after separating the supernatant the cells were washed with 500 ml of water. The separated supernatant and wash liquid showed a total enzymatic activity of 90.3 %. The extraction yield was much higher than the extraction yield obtained with the employment of S.D.S. and the extraction was attainable in a shorter period than with S.D.S.

What we claim is:

1. A process for liberating intracellular transferase or hydrolase enzymes from the mycelia or cells of fungi or bacteria microorganisms containing said enzymes comprising extracting the enzymes from said mycelia or cells with aqueous urea solution without inactivating the enzymes, and separating the enzymes from the extract.

2. A process claimed in claim 1 wherein the process is characterized in that the extraction is performed at a temperature in the range of 10° – 50° C.

3. A process claimed in claim 1 wherein said extraction is performed with an urea solution with a concentration which lies in the range of 0.5 M – 6.0 M.

4. A process claimed in claim 1 wherein the extraction of enzymes from microorganisms, which produce urease as a by-product, is performed with an addition of an inhibitor of urease.

* * * * *